United States Patent [19]

Langendorf et al.

[11] Patent Number: 4,860,197
[45] Date of Patent: Aug. 22, 1989

[54] BRANCH CACHE SYSTEM WITH INSTRUCTION BOUNDARY DETERMINATION INDEPENDENT OF PARCEL BOUNDARY

[75] Inventors: Brian K. Langendorf, Worcester; Neil J. Johnson, Burlington, both of Mass.

[73] Assignee: Prime Computer, Inc., Natick, Mass.

[21] Appl. No.: 80,457

[22] Filed: Jul. 31, 1987

[51] Int. Cl.⁴ .............................................. G06F 9/38
[52] U.S. Cl. .............................. 364/200; 364/243.41; 364/261.3; 364/263.1
[58] Field of Search ... 364/200 MS File, 900 MS File

[56] References Cited

U.S. PATENT DOCUMENTS

| | | | |
|---|---|---|---|
| 3,559,183 | 1/1971 | Sussenguth | 364/200 |
| 3,940,741 | 2/1976 | Horikoshi et al. | 364/200 |
| 4,200,927 | 4/1980 | Hughes et al. | 364/200 |
| 4,370,711 | 1/1983 | Smith | 364/200 |
| 4,430,706 | 2/1984 | Sand | 364/200 |
| 4,435,756 | 3/1984 | Potash | 364/200 |
| 4,477,872 | 10/1984 | Losq et al. | 364/200 |
| 4,604,691 | 8/1986 | Akagi | 364/200 |
| 4,764,861 | 8/1988 | Shibuya | 364/200 |

Primary Examiner—Raulfe B. Zache
Attorney, Agent, or Firm—Wolf, Greenfield & Sacks

[57] ABSTRACT

A branch cache system for use with a pipelined processor having overlapping parcel prefetch and execution stages. The system includes a plurality of memory sets for storing a plurality of indexed sets of predicted branch addresses, and control circuitry which determines whether there is stored in one of the memory sets a predicted branch address which corresponds to a branch instruction fetched by the prefetch stage. The execution stage is commanded, responsive to detection of a predicted branch address corresponding to that branch instruction, to execute the branch instruction to the predicted branch address. Alternatively, the system includes one or more memory sets for storing predicted branch addresses and corresponding alignment values which represent whether the boundary of a prefetched branch instruction, which is prefetched as one or more parcels, aligns with the fixed boundary of the one or more parcels containing that instruction. The execution stage is commanded to disregard the prefetched parcel containing a portion of the prefetched branch instruction if the alignment value corresponding to the predicted branch address for that prefetched instruction indicates that the boundary for the prefetched instruction does not align with the boundary of the prefetched parcel.

8 Claims, 4 Drawing Sheets

| PARCEL PREFETCH ADDRESS | INSTRUCTION BOUNDARIES | |
| --- | --- | --- |
| 1000 | ADD | ADD |
| 1002 | ADD | JSR 1 |
| 1004 | JSR 2 | ADD |
| 1006 | BEQ 1 | |
| 1008 | ADD | BEQ 2 WSBs |
| 100A | BEQ 2 LSBs | ADD |
| 100C | JSR 3 | JSR 4 |

*Fig. 4*

BRANCH CACHE SYSTEM WITH INSTRUCTION BOUNDARY DETERMINATION INDEPENDENT OF PARCEL BOUNDARY

BACKGROUND OF THE INVENTION

The present invention relates to the field of digital computers and, in particular, to apparatus for processing instructions in high speed data processing systems.

A pipelined computer system divides computational tasks into a number of sequential subtasks. In such a pipelined computer system, each instruction is processed in part at each of a succession of hardware stages.

After the instruction has been processed at each of the stages, the execution is complete. In a pipelined configuration, as an instruction is passed from one stage to the next, that instruction is replaced by the next instruction in the program. Thus, the stages together form a "pipeline" which, at any given time, executes, in part, a succession of instructions. A pipelined computer system thus provides concurrent processing of a succession of instructions. Such instruction pipelines for processing a plurality of instructions in parallel are found in various computers.

When a pipelined system encounters a branch instruction, it is wasteful of computer resources to wait for execution of the instruction before proceeding with the next instruction fetch and execute. Therefore, Pipelined systems commonly utilize branch prediction mechanisms to predict the outcome of branch instructions before the execution of the instruction, and such branch prediction mechanisms are used to guide prefetching of instructions.

Accordingly, it is a known advantage to provide a mechanism to predict a change in program flow as a result of a branch instruction. It is also known, however, that there is a time penalty for an incorrect prediction of program flow. This time loss occurs when instructions issue along the incorrect path selected by the branch prediction mechanism.

Therefore, an object of the invention is to provide an improved branch prediction apparatus with a high rate of correct predictions, so as to minimize the time loss resulting from incorrect predictions.

In the prior art, the reduction of branch penalty is attempted through the use of a branch cache interacting with the instruction prefetch stage. The branch cache utilizes the address of the instruction being prefetched to access a table. If a branch was previously taken at a given address, the table so indicates, and in addition, provides the target address of the branch on its previous execution. This target address is used to redirect instruction prefetching, based on the likelihood that the branch will repeat its past behavior. This approach offers the potential for eliminating delays associated with branches. Branch cache memory structures are utilized to permit predictions of non-sequential program flow following a branch instruction, prior to a determination that the instruction is capable of modifying program flow.

A system utilizing a branch cache does not require computation of the branch address before instruction prefetching can continue. Instead, the branch cache is used to make predictions based solely on previous instruction locations, thereby avoiding the wait for decoding of the current instruction before proceeding with prefetch of the next instruction. The branch address need not be calculated before prefetching can proceed, because target or branch addresses are stored in the branch cache.

There are, however, delays due to incorrect prediction of branches. Moreover, in a computer system which utilizes complex commands instructions requiring an interpretive instruction set, such as microcode, fetches parcels of fixed length and processes instructions of different lengths, the number of correct branch predictions provided by a prior art branch cache is reduced. This reduction results from branch instructions which terminate in the middle of prefetched parcels. Prior art branch cache systems can process only a single prediction per parcel, and, in pipelined computer systems, a parcel can contain two or more branch instructions.

Accordingly, it is an object of the invention to provide a branch cache system which can generate predictions of program flow changes at any point within parcel boundaries. This is especially important in systems where instruction granularity differs from parcel granularity.

It is another object of the invention to provide a multiset branch cache system having set selection elements for selecting a branch prediction from among at least two branch predictions per parcel.

SUMMARY OF THE INVENTION

The invention achieves the above objects by providing a multiple set branch cache system. Each set in the branch cache stores branch or target addresses together with alignment bits which indicate alignment between parcel boundaries and instruction boundaries.

The alignment bit or bits stored with a given branch target address are set to a predetermined first value if the corresponding branch instruction terminated at the end of a parcel. The alignment bit or bits stored with a branch address are set to a second predetermined value if the corresponding branch instruction terminated in the middle of a parcel. The value of the alignment bits is thus dependent upon where a given instruction terminates.

The invention also includes a set selection or controller element which is responsive to the value of the alignment bits and to the value of a predetermined number of least significant bits (LSBs) of the program counter (PC). This predetermined number of LSBs of the program counter are extracted and used as a pointer, referred to as a half-word pointer. The controller element selects from the multiple set branch cache a branch address corresponding to the branch instruction being fetched, based on a comparison of the values of the alignment bits and the half-word pointer. This comparison is indicative of the alignment between the next instruction to be processed by the prefetch section, and the instruction for which a branch address is stored in branch cache.

In particular, the alignment bits are a predetermined number (n) of instruction address LSBs utilized to specify the location, i.e., endpoint, of a given branch instruction within a given parcel. If, for example, a computer system fetches 128 bit parcels, with branch instructions as small as 16 bits, then there are 128/16 or 8 possible endpoints for a given branch instruction within a given parcel. Moreover, given 32 bit parcels and 32 or 48 bit instructions, each parcel can contain only one instruction, but there are two possible instruction endpoints in each parcel.

Because n bits can specify $2^n$ endpoints, 3 LSBs are used to specify the endpoint of a branch instruction within a parcel in the preceding example. When the controller circuitry thus selects a branch address from the sets of the branch cache, it transmits the selected branch address to the prefetch section of the pipeline, and the branch address is used as the address of a succeeding instruction prefetch.

The invention will next be described in connection with certain illustrated embodiments. However, it should be clear that various changes, modifications and additions can be made by those skilled in the art without departing from the scope of the invention as defined in the claims.

BRIEF DESCRIPTION OF THE DRAWINGS

For a fuller understanding of the nature and objects of the invention, reference should be made to the following detailed description and the accompanying drawings in which

FIG. 4 is a functional block diagram illustrating the operation of the parcel prefetch stage of a computer system incorporating the multiple set branch cache illustrated in FIG. 3.

DESCRIPTION OF ILLUSTRATED EMBODIMENTS

Figure 1:
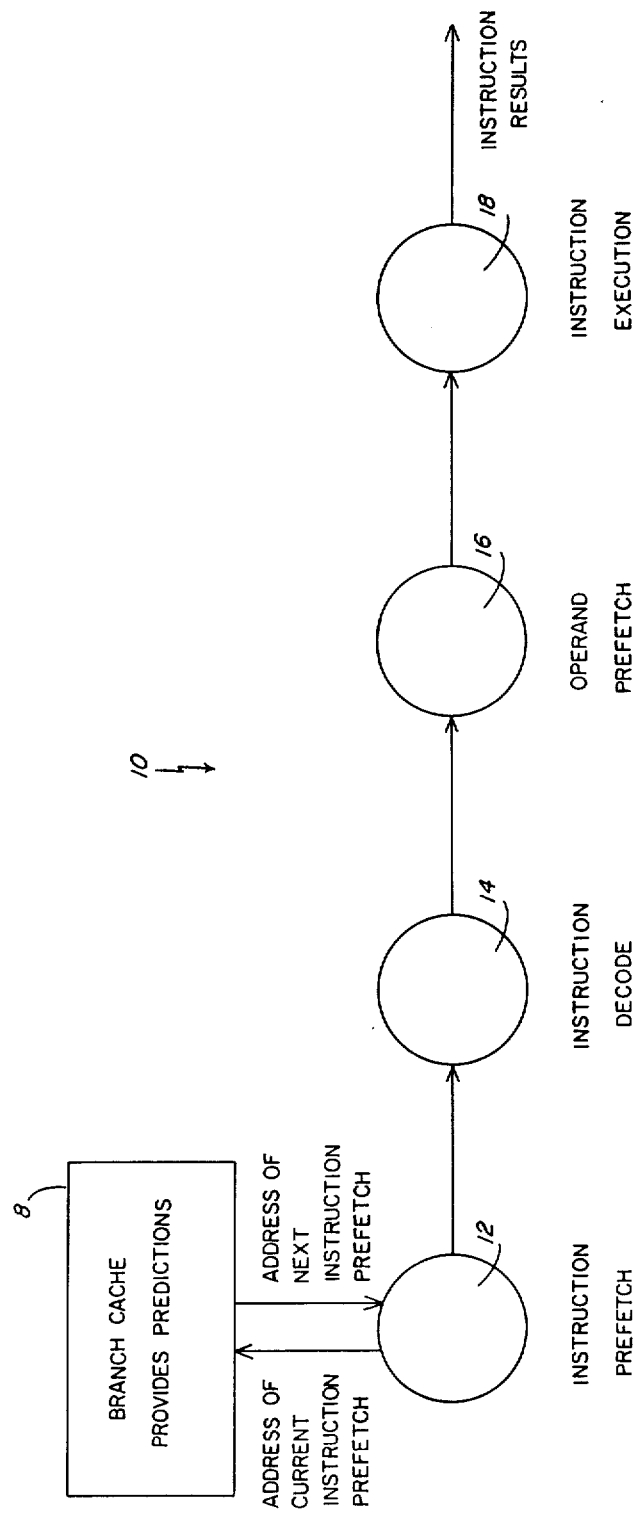
FIG. 1 is a functional block diagram of a prior art pipelined computer system incorporating a branch cache.

FIG. 1 is a block diagram of a pipelined computer system 10 employing a branch cache 8. Instruction prefetch section 12 fetches instructions out of a memory unit and transmits the instructions to instruction decode section 14. After the instruction is decoded in decode section 14, the instruction is passed to operand prefetch section 16. Operand section 16 fetches operands out of a memory unit and passes both the decoded instruction and the operand to instruction execution stage 18, which, in turn, generates instruction results. Branch cache 8 is in communication with instruction prefetch section 12. Branch cache 8 receives from instruction prefetch section 12 the address of a current instruction prefetch. Branch cache 8 provides, as known in the art, the predicted address of a succeeding instruction prefetch.

Figure 2:
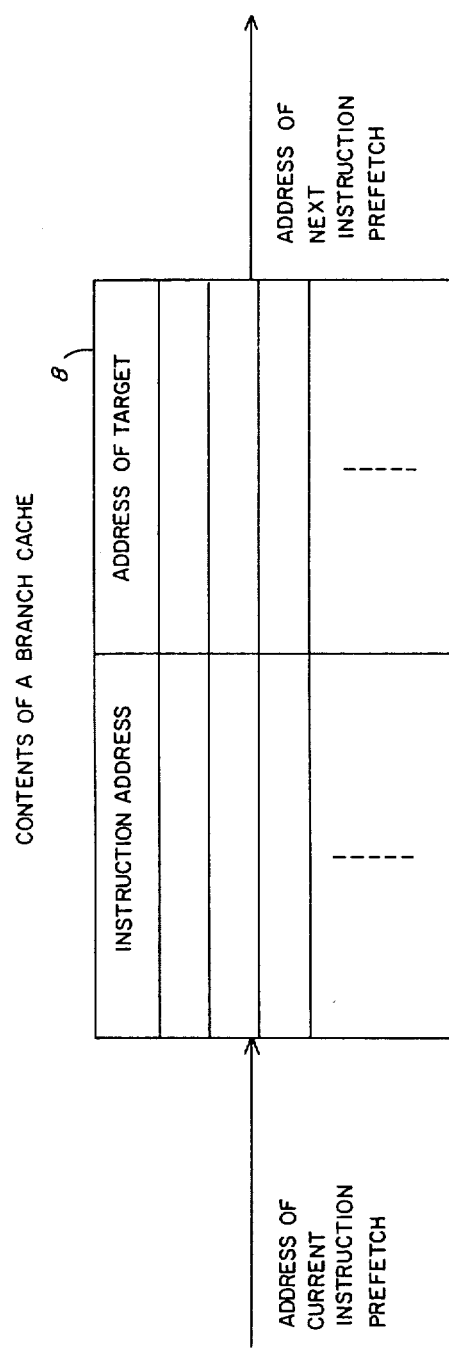
FIG. 2 is a block diagram of the contents of a prior art branch cache.

The contents of a prior art branch cache 8 are illustrated in FIG. 2. Branch cache 8 receives as input the address of the current instruction prefetch, and this address is used to index a table. The table stores target branch addresses previously encountered for each fetched instruction. Branch cache 8 then transmits the predicted address of a next instruction prefetch. The prior art branch cache system illustrated in FIGS. 1 and 2 did not provide processing of multiple branch target addresses per parcel, and did not provide a multiple-bit alignment field. The prior art systems provided only one bit indicative of alignment, referred to as an "odd-size" bit. The value of the odd-size bit informed the instruction unit how much of a parcel was left to be decoded, in effect signalling the instruction unit to stop processing a given parcel and begin processing a succeeding parcel.

To enable accurate prediction of branch addresses for branch instructions which end between parcel boundaries, a branch cache system according to the invention includes plural branch cache sets which store not only a data field of branch addresses, which in a preferred embodiment are addressable by instruction addresses, but also a data field of alignment bits. This is illustrated in FIG. 3.

Figure 3:
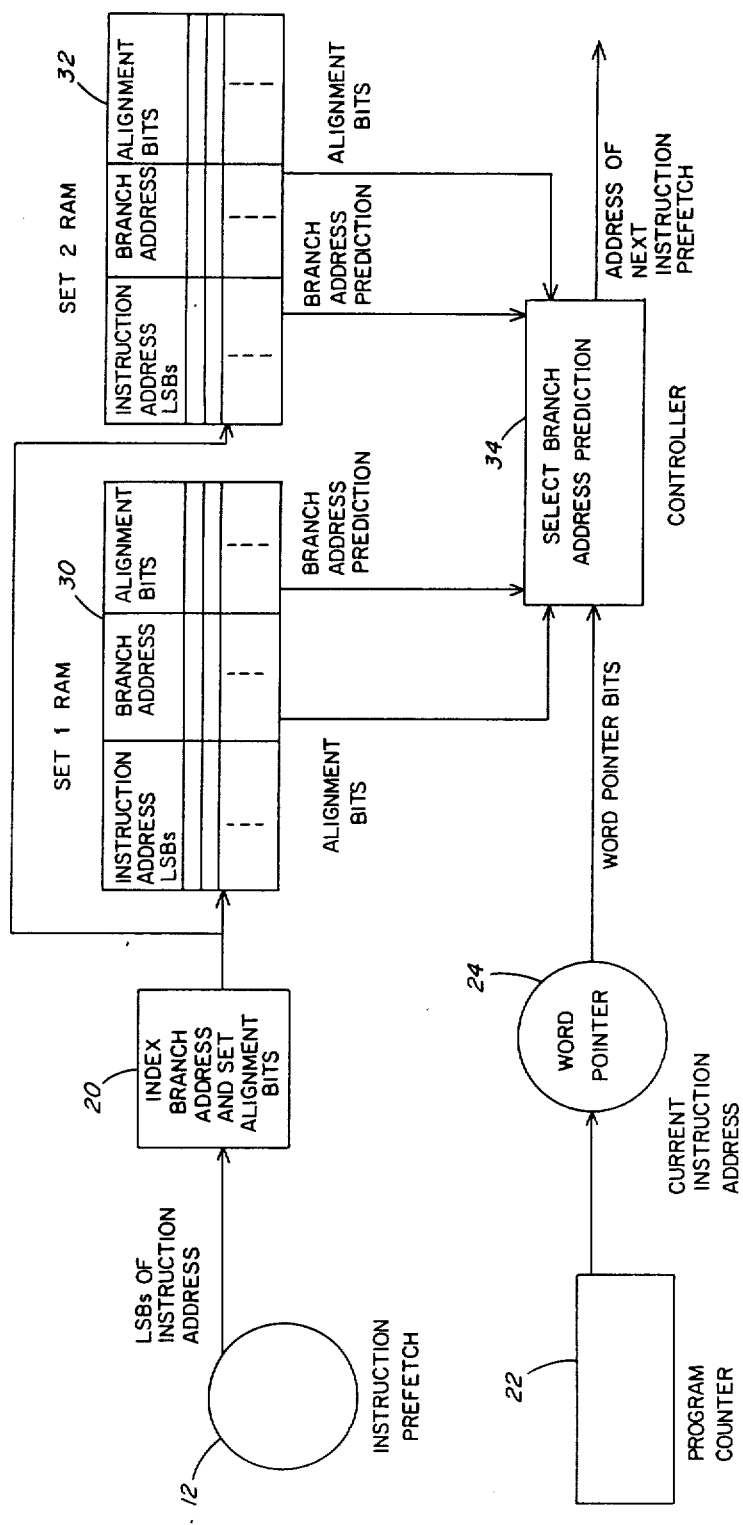
FIG. 3 is a functional block diagram of a multiple set branch cache with alignment bits according to the invention.

Referring to FIG. 3, instruction prefetch stage 12 fetches parcels of fixed length, and is implemented in a computer system having branch instructions of different lengths. Prefetch stage 12 transmits to indexer 20 the LSBs of the instruction address currently being fetched. Indexer 20 utilizes the LSBs of the instruction address to address Random Access Memories (RAM) 30 and 32, respectively, in a manner described in greater detail hereinafter. RAM 30 includes a set of memory locations which collectively comprise branch cache Set 1. Similarly, RAM 32 includes a set of memory locations which collectively comprise branch cache Set 2.

The branch cache initially contains no entries. In loading or updating the branch cache, each time a branch instruction is executed, indexer 20 transmits to the branch cache a signal representative of the instruction address LSBs, as well as the branch target address corresponding to the branch instruction. This information is stored in locations of branch cache RAMs 30 and 32, indexed by the LSBs of the corresponding branch instruction address. Indexer 20 also transmits to RAMs 30 and 32 a signal representative of the value of alignment bits to be stored with each branch target address entry in RAMs 30 and 32. The value of the alignment bits indicates the alignment between the fetched instruction and the parcel boundary.

When the branch cache RAMs 30 and 32 are loaded with branch target address entries, branch address entries corresponding to a given branch instruction can then be extracted from the branch cache, in a manner described in greater detail below, whenever indexer 20 addresses the branch cache RAMs 30 and 32 with a branch instruction address.

In one embodiment of the invention, indexing element 20 allocates target branch address entries to RAMs 30 and 32, i.e. branch cache Set 1 and Set 2 respectively, in an alternating pattern, writing an entry to one RAM and a succeeding entry to the other. Thus, in such an index scheme, if a parcel fetched by instruction prefetch section 12 contained the end of two branch instructions, there may be two entries associated with that parcel in the branch cache collectively formed by RAMs and 30 and 32. The first branch target address entry could be placed by indexer 20 in either branch cache set, while the second entry would be in the set not containing the first entry.

While the above example involves two possible instruction endpoints within a parcel, it will be apparent to those skilled in the art that the invention may be practiced in embodiments having $2^n$ endpoints, where n = the number of bits required to specify the endpoints.

In a preferred embodiment of the invention, indexer 20 loads entries into RAMs 30 and 32 at locations having offsets calculated from an origin RAM location. The offset for an entry is determined by the LSBs of the address of the branch instruction corresponding to the entry.

Thus, for example, a branch address entry for a branch instruction having address 1000 will be stored in branch cache at the origin location (offset 0) and a branch address entry for a branch instruction having address 1006 will be stored at the RAM location having offset 6.

Continuing the above example, if a single set branch cache contains entries for the two branch instructions set forth in the above example, and the pipelined system then encounters a branch instruction having address 2000, the entry for the branch instruction having address 1000 would be overwritten, because both instruction addresses have the same LSBs.

In contrast, in a multiple set branch cache according to the invention, an entry for the branch instruction having address 2000 can be written into a second branch cache set at an origin location, and an entry for a branch instruction having address 2006 can be written into the second branch cache set at offset 6. An advantage of the multiple set branch cache thus becomes clear: entries can be simultaneously stored for multiple branch instructions having the same LSBs and different MSBs, by storing entries at the same offset in different branch cache sets.

Indexer 20 is described in greater detail in related U.S. patent application, Ser. No. 080,451, filed on even date, and the specification of said application is incorporated herein.

RAMs 30 and 32, as described above, will therefore contain a table of branch addresses taken by previously executed branch instructions, together with an alignment bit field for each branch address entry. If the invention is practiced in a pipelined system wherein a given branch instruction may terminate at any of $2^n$ endpoints in a given parcel, the alignment bit field will contain n bits. If, for example, a computer system fetches parcels of 128 bit length, with branch instructions having lengths of integer multiples of 16 bits, with 16 bit instructions being the smallest instructions, then there are 128/16 or 8 possible endpoints for a given branch instruction within a given parcel. The alignment field would contain three bits in this example, because three bits can specify 8 endpoints.

In a preferred embodiment of the invention, practiced in a computer system in which fetched parcels are twice as long as the shortest branch instructions, and in which branch instructions can terminate in the middle or at the end of parcels, only one alignment bit is stored with each target branch address entry in each set. The alignment bit stored in branch cache with a given branch address is set to a value of logic ONE if the end of the corresponding branch instruction aligns with the middle of a prefetched parcel. Conversely, the alignment bit for a given branch address entry is set to a value of logic ZERO if the end of the corresponding branch occurs at the end of a fetched parcel.

Referring to FIG. 3, program counter 22 transmits to half-word pointer 24 the current instruction address being fetched. Half-word pointer element 24 extracts a predetermined number of LSBs of the current instruction address, referred to as half-word pointer bits, and transmits the LSBs to controller element 34. Controller element 34 also receives alignment and branch address inputs from RAMs 30 and 32. Controller 34 selects branch address predictions from those received from Set 1 and Set 2 of branch cache. This selection scheme is based on alignment bits and half-word pointer bits and is illustrated below in Table 1.

The following table illustrates all possible combinations of alignment bit values, branch address locations (referred to as "hit" locations) and address LSB values (i.e. a one-bit half-word pointer), for a two-set branch cache system in which one alignment bit is stored with each entry. The table assumes that instructions are fetched 32 bits at a time. The smallest addressable unit is 16 bits and thus a given instruction can terminate at either the middle or end of a given parcel. The two possible alignments are specified by one alignment bit.

"Align 1" and "Align 2" refer to the value of the alignment field (one bit in this example) of the branch cache entries fetched from Set 1 and Set 2 respectively. In this embodiment of the invention, the alignment bit stored with a given branch address is equal to the LSB of the address at which the corresponding branch instruction ends. "Hit 1" and "Hit 2" are values which indicate whether a valid entry associated with a current instruction is stored in a given branch cache set. A Hit value of 1 refers to the results of confirming that a given branch cache set contains a valid entry that is associated with a current address.

The determination of whether a valid entry associated with a current branch instruction exists in branch cache is performed by hardware in controller 34. That hardware may be constructed in accordance with prior art branch cache practice, or preferably in accordance with the construction described in related U.S. patent application Ser. No. 080,452, filed on even date, entitled Method and Apparatus For Validating Branch Cache Entries, the specification of which being incorporated herein.

Referring to Table I, a Set Select result of "Neither" indicates that there is no prediction present in the branch cache for the current address. A Set Select result of "Both" indicates that both branch cache sets contain a prediction for the current address. A Set Select condition of "Both" will not normally occur because branch cache entries are not duplicated in normal operation. Initially, there are no entries in branch cache. As branch instructions are executed, the branch cache is interrogated. If an entry does not exist for a given branch instruction, the indexer 20 will load an entry for that branch instruction. If an entry does exist for a branch instruction, the entry will be utilized, but not duplicated.

TABLE I

| Address LSB | Align1 | Align2 | Hit1 | Hit2 | Set Selected |
|---|---|---|---|---|---|
| 0 | 0 | 0 | 0 | 0 | Neither |
| 0 | 0 | 0 | 0 | 1 | 2 |
| 0 | 0 | 0 | 1 | 0 | 1 |
| 0 | 0 | 0 | 1 | 1 | Both |
| 0 | 0 | 1 | 0 | 0 | Neither |
| 0 | 0 | 1 | 0 | 1 | 2 |
| 0 | 0 | 1 | 1 | 0 | 1 |
| 0 | 0 | 1 | 1 | 1 | 1 |
| 0 | 1 | 0 | 0 | 0 | Neither |
| 0 | 1 | 0 | 0 | 1 | 2 |
| 0 | 1 | 0 | 1 | 0 | 1 |
| 0 | 1 | 0 | 1 | 1 | 2 |
| 0 | 1 | 1 | 0 | 0 | Neither |
| 0 | 1 | 1 | 0 | 1 | 2 |
| 0 | 1 | 1 | 1 | 0 | 1 |
| 0 | 1 | 1 | 1 | 1 | Both |
| 1 | 0 | 0 | 0 | 0 | Neither |
| 1 | 0 | 0 | 0 | 1 | Neither |
| 1 | 0 | 0 | 1 | 0 | Neither |
| 1 | 0 | 0 | 1 | 1 | Neither |
| 1 | 0 | 1 | 0 | 0 | Neither |
| 1 | 0 | 1 | 0 | 1 | 2 |

TABLE I-continued

| Address LSB | Align1 | Align2 | Hit1 | Hit2 | Set Selected |
|---|---|---|---|---|---|
| 1 | 0 | 1 | 1 | 0 | Neither |
| 1 | 0 | 1 | 1 | 1 | 2 |
| 1 | 1 | 0 | 0 | 0 | Neither |
| 1 | 1 | 0 | 0 | 1 | Neither |
| 1 | 1 | 0 | 1 | 0 | 1 |
| 1 | 1 | 0 | 1 | 1 | 1 |
| 1 | 1 | 1 | 0 | 0 | Neither |
| 1 | 1 | 1 | 0 | 1 | 2 |
| 1 | 1 | 1 | 1 | 0 | 1 |
| 1 | 1 | 1 | 1 | 1 | Both |

As illustrated above in TABLE I, controller 34 examines the locations of branch cache sets one and two to determine whether, for a instruction being fetched, there exists in branch cache a corresponding branch address prediction. If no branch cache prediction exists in either branch cache set, that circumstance is referred to as a "miss" on both sets. In such a case, the controller 34 transmits no next instruction prefetch.

If there exists in branch cache at least one branch address prediction for the instruction being fetched, that is referred to as a "hit". If there is a "hit" in at least one set for a branch instruction being fetched, controller 34 compares the alignment bit for each "hit" branch address with the half-word pointer bit. If the alignment bit of a "hit" branch address equals the bit value of the half-word pointer, the controller selects that branch address for transmitting to instruction prefetch section 12.

If there are no "hit" entries whose alignment bit value equals the half-word pointer value, controller 34 determines whether any "hit" branch address has an associated alignment bit value greater than the value of the half-word pointer. If there is such a branch address entry, then controller 34 selects that entry for transmitting to instruction prefetch Section 12. If there is no "hit" branch address entry having an alignment bit value greater than the half-word pointer value, then no entry is transmitted to instruction prefetch Section 12. The program counter will be incremented as described above, and prefetching will continue.

The effect of these selection rules is that branch address prediction entries are transmitted by controller 34 so long as the half-word pointer has not passed the branch instruction address corresponding to the target address entry.

This function is illustrated by the following program example, in which add instructions (ADD) are 16 bits long, branch if equal instructions (BEQ) are 32 bits long, and the jump to subroutine instructions (JSR) are 16 bits long.

| ADDRESS | INSTRUCTION |
|---|---|
| 1000 | ADD |
| 1001 | ADD |
| 1002 | ADD |
| 1003 | JSR1 |
| 1004 | JSR2 |
| 1005 | ADD |
| 1006 | BEQ1 |
| 1008 | ADD |
| 1009 | BEQ2 |
| 100B | ADD |
| 100C | JSR3 |
| 100D | JSR4 |
| 100E | ADD |
| 100F | BEQ3 |
| 1011 | JSR5 |

This program would be fetched in 32 bit parcels as illustrated in FIG. 4.

Referring now to FIG. 4, when the program begins executing, the parcel at location 1000 will be fetched. This parcel contains the first two instructions, both ADDs. Neither instruction can cause a change in flow, so the branch cache should not contain an entry for this parcel, and will therefore miss on both sets.

The prefetch unit will fetch the parcel at location 1002 next. The JSR1 instruction can cause a change of flow, so the branch cache may contain an entry for this parcel. If there is an entry in the branch cache, its alignment bit will be a ONE because the LSB of the address of the JSR1 instruction is a ONE. If the branch cache contains a prediction, the next parcel to be fetched will contain the first instruction of the JSR1 subroutine.

The first parcel fetched upon return from the JSR1 subroutine will be at location 1004. This parcel contains the JSR2 instruction, so there may be a prediction in the branch cache. If there is an entry in the branch cache, the alignment bit will be a ZERO because the LSB of the address of JSR2 is a ZERO. If there is a prediction, the next parcel to be fetched will contain the first instruction of the JSR2 subroutine.

The next instruction that the program wishes to execute upon returning from the JSR2 subroutine is the ADD at address 1005. The parcel at location 1004 is fetched because it contains the instruction that is to be executed. The branch cache is accessed, and it is determined that it contains an entry for this parcel. However, the alignment bit for this entry is a ZERO and the LSB of the address of the next instruction is a ONE. This indicates that the first instruction in the parcel that is to be executed (the ADD) has a larger address than the instruction that the prediction is associated with and therefore the prediction should not be used. That is, a given branch address will not be utilized if the word pointer indicates that the prefetch stage has already passed the corresponding instruction.

The next parcel to be fetched is at location 1006. This parcel contains one instruction, BEQ1. There may be an entry in the branch cache for this instruction. If there is an entry its alignment bit will be a ONE because the LSB of the address of the end of the BEQ1 instruction is a ONE.

If the branch is not taken the next parcel to be fetched is at address 1008. This parcel will not have a branch cache entry associated with it because an instruction that can change program flow does not end in this parcel.

The address of the next parcel fetched will be 100A. A branch cache entry may be associated with this parcel because BEQ2 ends in this parcel. If there is a branch cache entry it will have an alignment bit of ZERO.

The address of the next parcel fetched will be 100C. There could be two entries in the branch cache associated with this parcel. One entry would be associated with JSR3, have an alignment bit of ZERO, and be in either branch cache set. The other entry would be associated with JSR4, have an alignment bit value of ONE, and be in the other set. In this case when this parcel is fetched both branch cache sets would contain valid entries for this parcel. The LSB of the address of the next instruction to be executed is a ZERO (address of 100C) which indicates that the entire parcel is to be executed. The instruction with the lowest address (JSR3) should be executed first. The branch cache entry associated with this instruction will have its alignment bit set to ZERO and this is the entry that is chosen to make the prediction.

When the program returns from the JSR3 subroutine the address of the next instruction will be 100D (JSR4). The parcel at address 100C is fetched because it contains the next instruction to be executed. Both branch cache sets will again contain entries associated with this parcel. However, the LSB of the address of the next instruction is now a ONE. This indicates that the address of the next instruction is larger than the address of the instruction that had the branch cache entry with an alignment bit of ZERO (JSR3). Therefore, the branch cache entry with an alignment bit of ONE (associated with JSR4) is used to make the prediction.

The invention has been described in connection with an embodiment which utilizes a two set branch cache and a single bit alignment field. The invention can also be practiced in an embodiment which employs more than two branch cache sets and two or more alignment bits in the alignment field. As discussed above, where the invention is practiced in a system wherein a given branch instruction can terminate at any of $2^n$ endpoints in a given parcel, n alignment bits will be stored with each branch cache entry.

It will thus be seen that the invention efficiently attains the objects set forth above. It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all the generic and specific features of the invention as described herein, and all statements of the scope of the invention which, as a matter of language, might be said to fall therebetween.

Having described the invention, what is claimed as new and secured by letters patent is:

1. In a branch cache system for a pipelined processor having overlapping parcel prefetch and execution stages, the improvement comprising
    plural memory set means, for storing plural indexed sets of branch address prediction data words, each of said address prediction data words being representative of branch address predictions, and
    control circuitry means, connected to said plural memory set means, for determining whether there is stored in said plural memory set means an address prediction data word corresponding to a branch instruction fetched by said prefetch stage, and for causing, a responsive to detection of a data word corresponding to said branch instruction, said execution stage to execute said branch instruction to the branch address represented by said data word.

2. In a branch cache system for a pipelined processor having overlapping parcel prefetch and execution stages for processing instructions having variable boundaries, wherein said prefetch stage fetches portions of said instructions as parcels having fixed boundaries, the system comprising
    first means for storing an indexed set of branch address prediction data words,
    second means for storing, in association with said branch address prediction data words, a field of corresponding alignment bits having values representative of whether boundaries of a branch instruction fetched by said prefetch stage align with said fixed prefetch boundaries, and
    control circuitry means, connected to said second storage means and responsive to said alignment bit values, for causing said execution stage to execute a branch instruction being fetched if said branch instruction corresponds to an address prediction data word stored in said first storage means, and for causing said execution stage to disregard the parcel being prefetched if an alignment bit value corresponding to said data word indicates that the boundary of said branch instruction does not align with the fixed boundary of said parcel.

3. In a branch cache system for a pipelined processor having overlapping parcel prefetch and execution stages for processing instructions having variable boundaries, wherein said prefetch stage fetches portions of said instructions as parcels having fixed boundaries, the improvement comprising
    plural memory set means, for storing plural indexed sets of branch address prediction data words and an associated field of corresponding alignment bits having values representative of whether boundaries of a branch instruction being processed align with said fixed prefetch parcel boundaries, and
    control circuitry means, for (i) determining whether there is stored in said plural memory set means address prediction data words corresponding to a branch instruction fetched by said prefetch stage, for (ii) selecting, responsive to alignment bit values associated with said data words, one of said data words, wherein said selected data word has an associated alignment bit value indicative of alignment of said corresponding branch instruction and said parcel boundaries, and (iii) for causing said execution stage to execute said branch instruction to the branch address represented by said selected data word.

4. A branch cache system, for use in a pipelined processor having overlapping parcel prefetch and execution stages for processing instructions having variable boundaries, wherein said prefetch stage fetches portions of said instructions as parcels having fixed boundaries, the system predicting branch addresses to change program flow when the instructions are branch instructions to be executed, the system comprising:
    at least a first memory set for storing predicted branch addresses, each of said predicted branch addresses having an associated alignment value representing the relationship between the boundary of a prefetched branch instruction, corresponding to that predicted branch address, and the boundary of the parcel containing that instruction;
    program counter means for indicating the address of an instruction currently being prefetched; and
    controller means, connected to said first memory set and said program counter means, for comparing a preselected portion of the indicated instruction address with the alignment value to select from said first memory set a predicted branch address corresponding to the indicated instruction.

5. The branch cache system of claim 4 further including a second memory set, connected to said controller means, for storing predicted branch addresses and associated alignment values, said controller means selecting form said first and second memory sets a predicted branch address corresponding to the indicated instruction.

6. The branch cache system of claim 4 in which said controller means further includes means for providing said selected predicted branch address to said prefetch state to be utilized as the address of a succeeding instruction prefetch.

7. A branch cache system, for use in a pipelined processor having overlapping parcel prefetch and execution stages for processing instructions having variable boundaries, wherein said prefetch stage fetches portions of said instructions as parcels having fixed boundaries, the system predicting branch addresses to change program flow when the instructions are branch instructions to be executed, the system comprising:

at least first and second memory sets for storing predicted branch addresses;

instruction prefetch means for prefetching instructions;

index means, connected to said instruction prefetch means and to said first and second memory sets, for receiving from said instruction prefetch means a preselected number of bits of the address of a branch instruction currently being prefetched and a corresponding branch target address to which program flow is to be changed, for determining an alignment value representing the relationship between the boundary of the prefetched branch instruction and the boundary of the parcel containing that instruction, and for selectively writing said branch target address and said alignment value to said first and second memory sets, said branch target address serving as a predicted branch address for that branch instruction;

program counter means for indicating the address of an instruction currently being prefetched; and controller means, connected to said first and second memory sets and said program counter means, for comparing a preselected number of bits of the indicated instruction address with the alignment value to select from said first and second memory sets of predicted branch address corresponding to the indicated instruction.

8. The branch cache system of claim 7 in which said controller means further includes means for providing said selected predicted branch address to said instruction prefetch means to be utilized as the address of a succeeding instruction prefetch.

* * * * *